Jan. 31, 1933.     B. J. PEPPER     1,896,056
FLUID DISPENSING APPARATUS
Filed Nov. 27, 1931     13 Sheets-Sheet 1
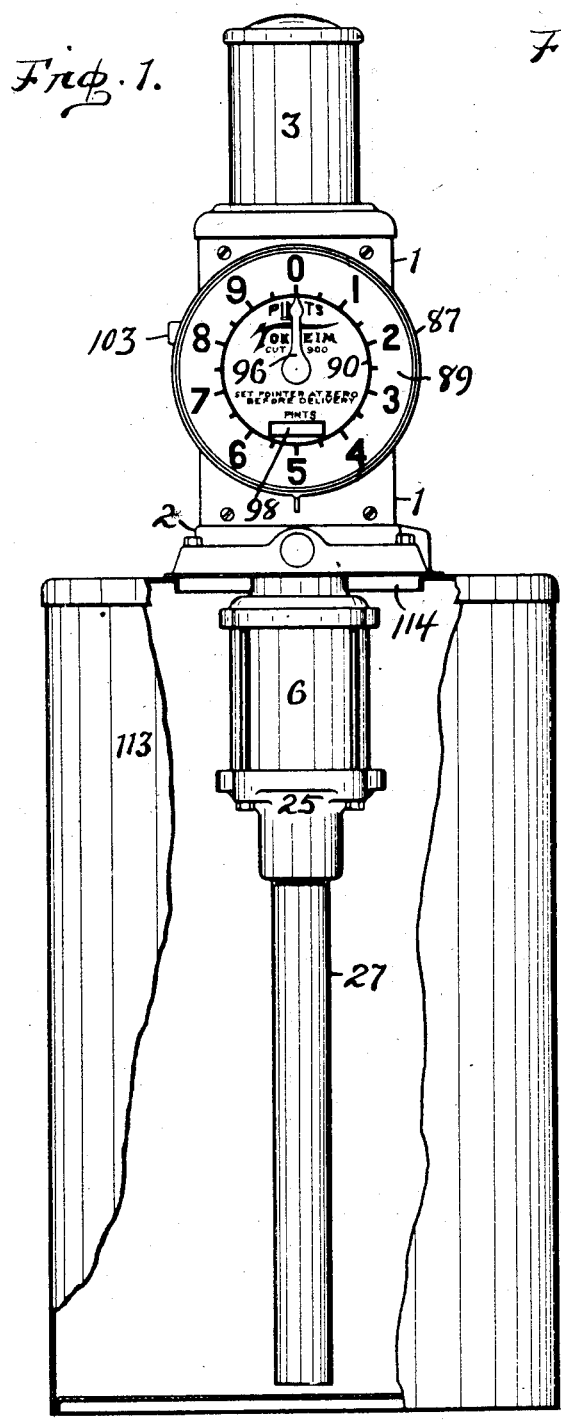
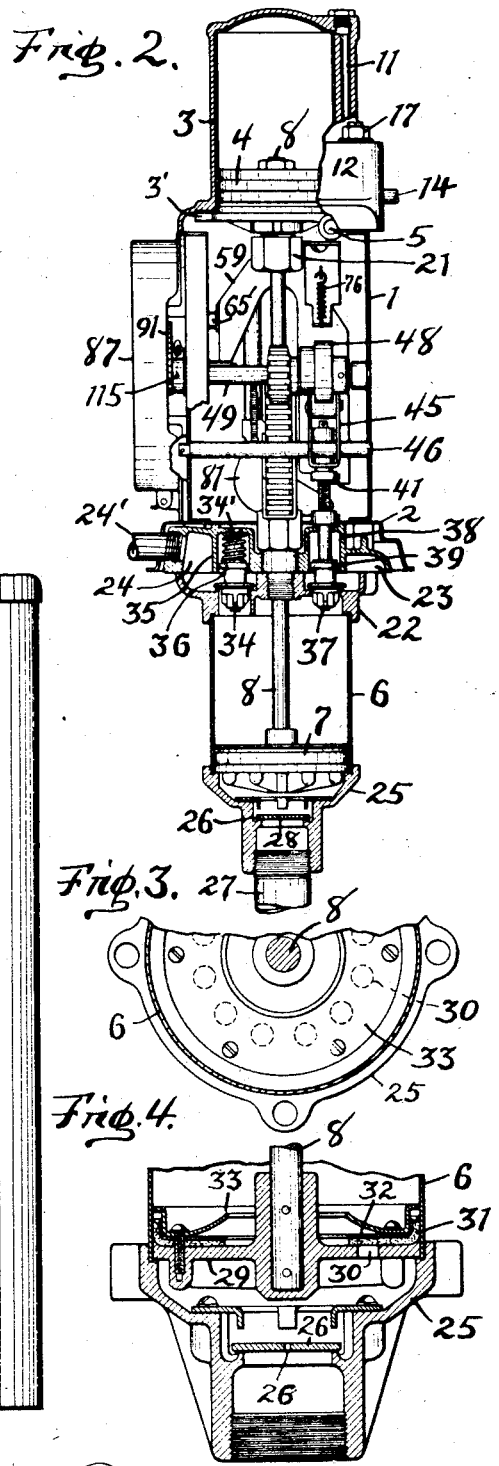
Byron J. Pepper INVENTOR
BY
A. G. Burns ATTORNEY Jan. 31, 1933.  B. J. PEPPER  1,896,056
FLUID DISPENSING APPARATUS
Filed Nov. 27, 1931   13 Sheets-Sheet 2
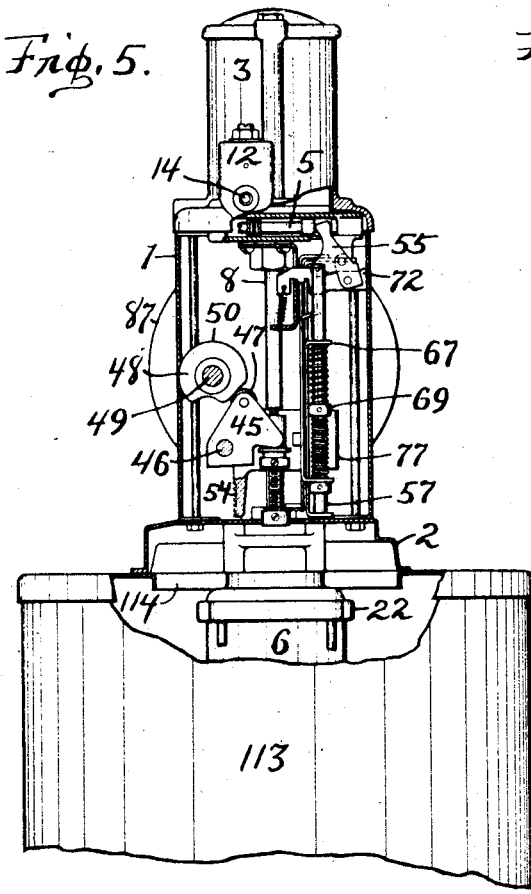
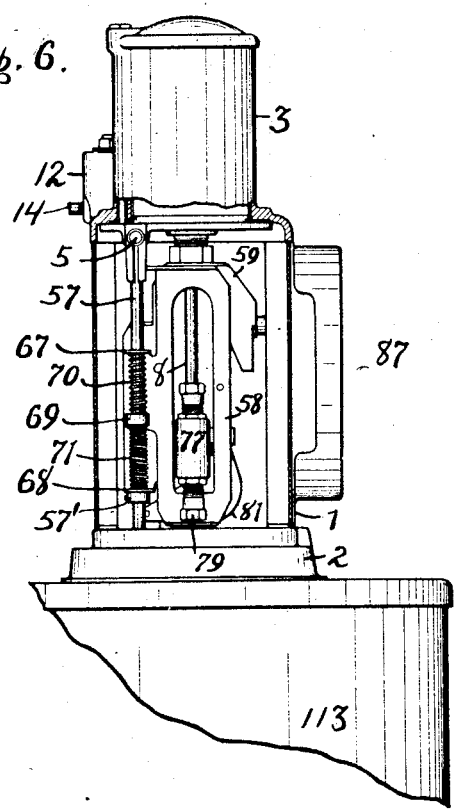
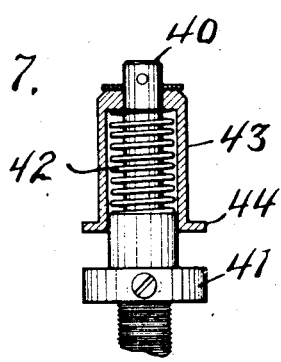
Byron J. Pepper
INVENTOR
BY
A. G. Burns  ATTORNEY Jan. 31, 1933. B. J. PEPPER 1,896,056
FLUID DISPENSING APPARATUS
Filed Nov. 27, 1931 13 Sheets-Sheet 3
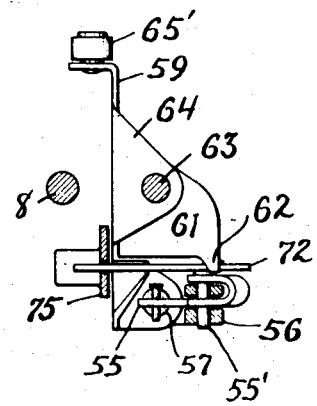
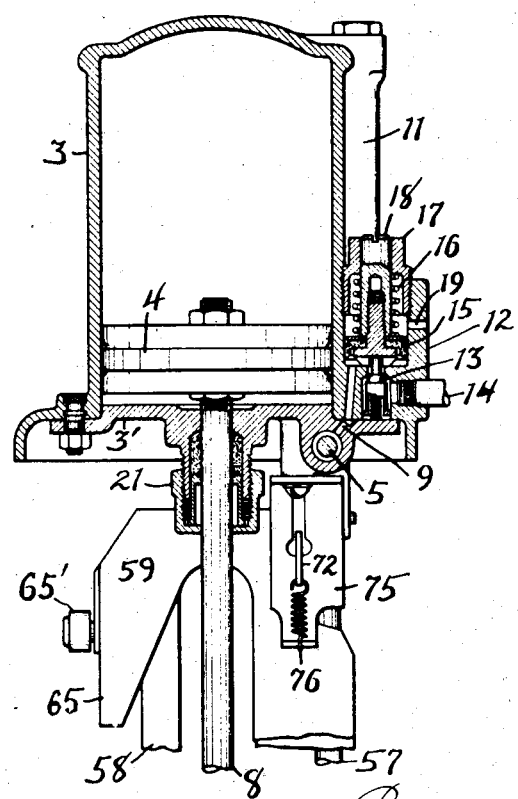
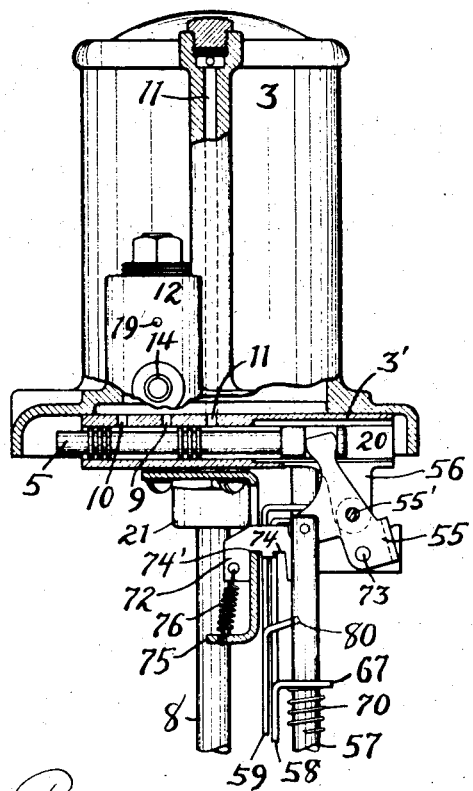
Byron J. Pepper INVENTOR
BY
A. G. Burns ATTORNEY Jan. 31, 1933.  B. J. PEPPER  1,896,056
FLUID DISPENSING APPARATUS
Filed Nov. 27, 1931  13 Sheets-Sheet 4
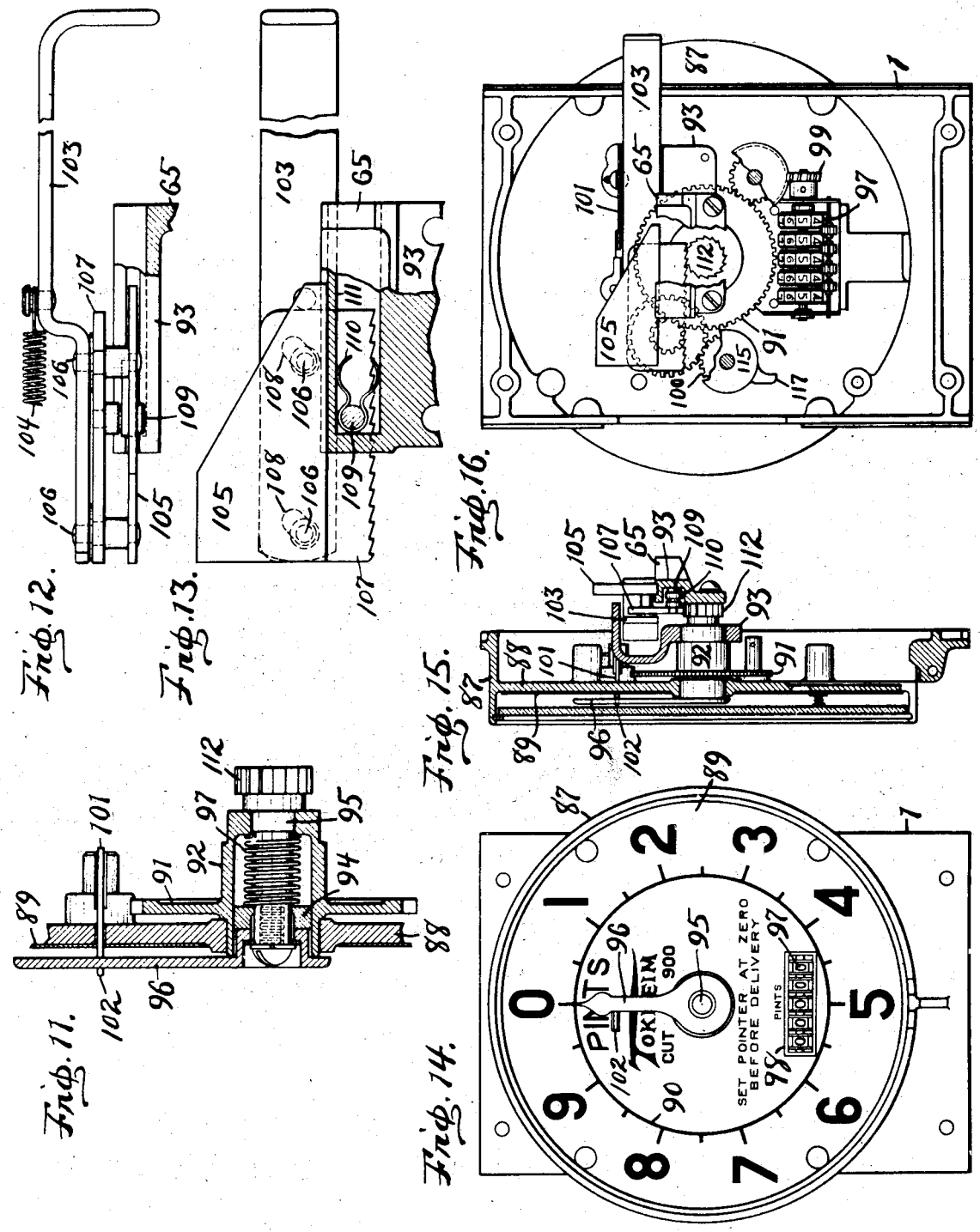
Byron J. Pepper
INVENTOR
BY
H. G. Burns  ATTORNEY Jan. 31, 1933.  B. J. PEPPER  1,896,056
FLUID DISPENSING APPARATUS
Filed Nov. 27, 1931  13 Sheets-Sheet 5
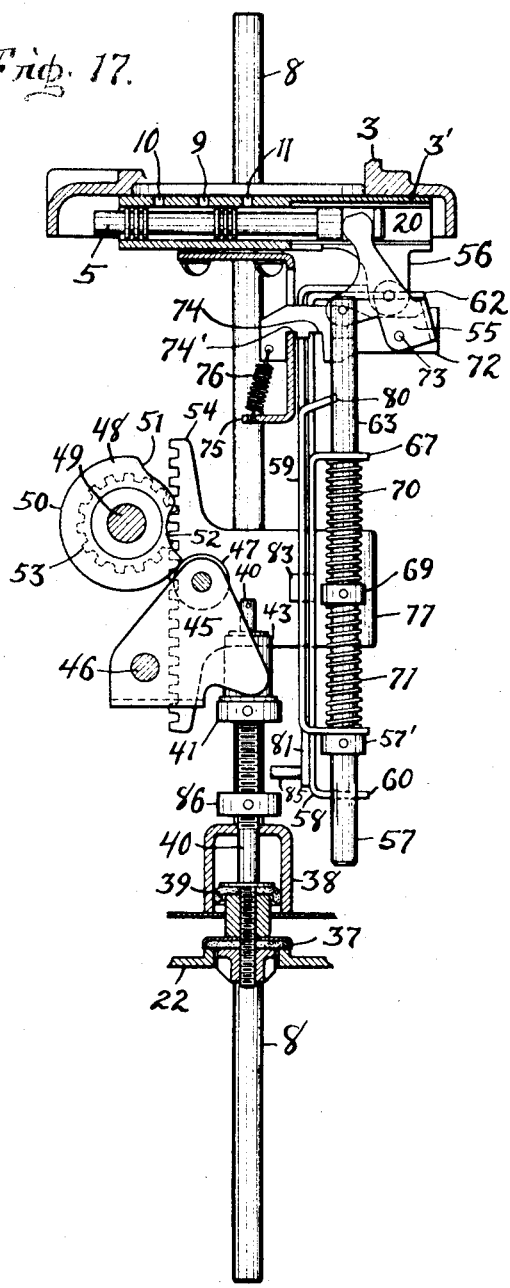
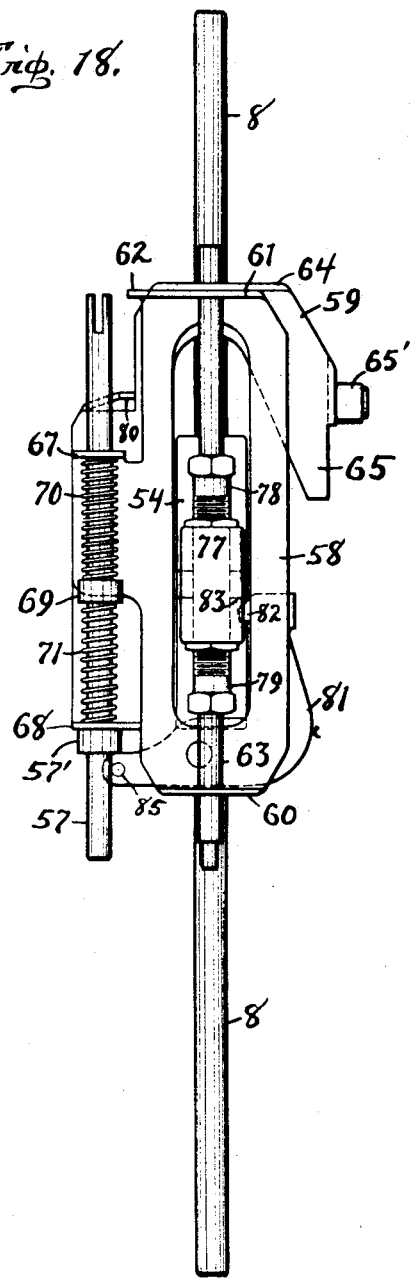
Byron J. Pepper
INVENTOR
BY
A. G. Burns ATTORNEY Jan. 31, 1933.    B. J. PEPPER    1,896,056
FLUID DISPENSING APPARATUS
Filed Nov. 27, 1931    13 Sheets-Sheet 6
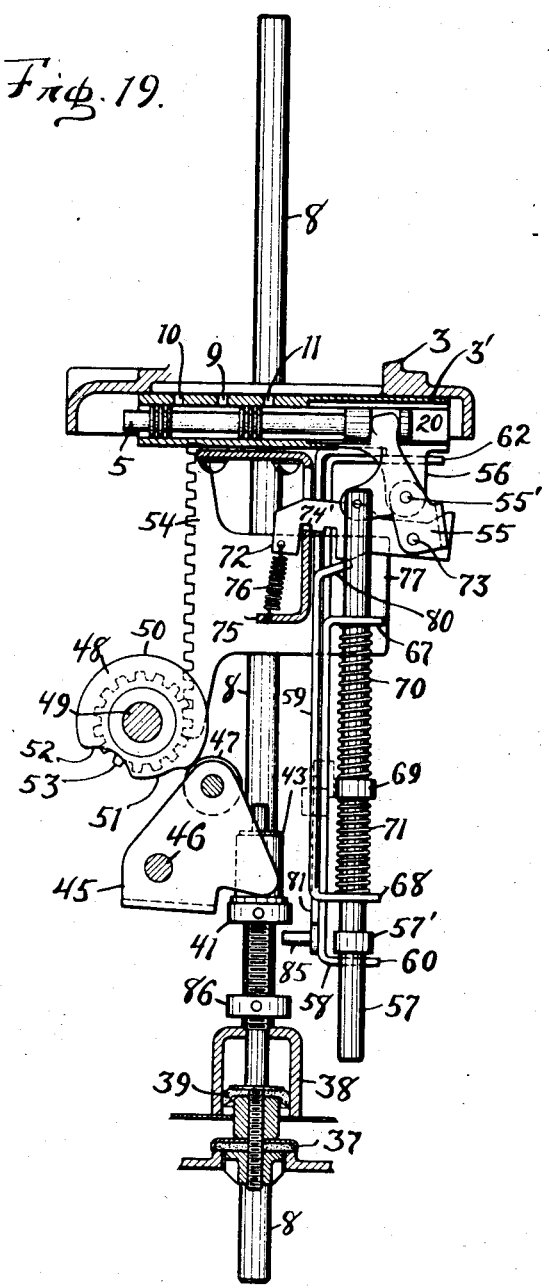
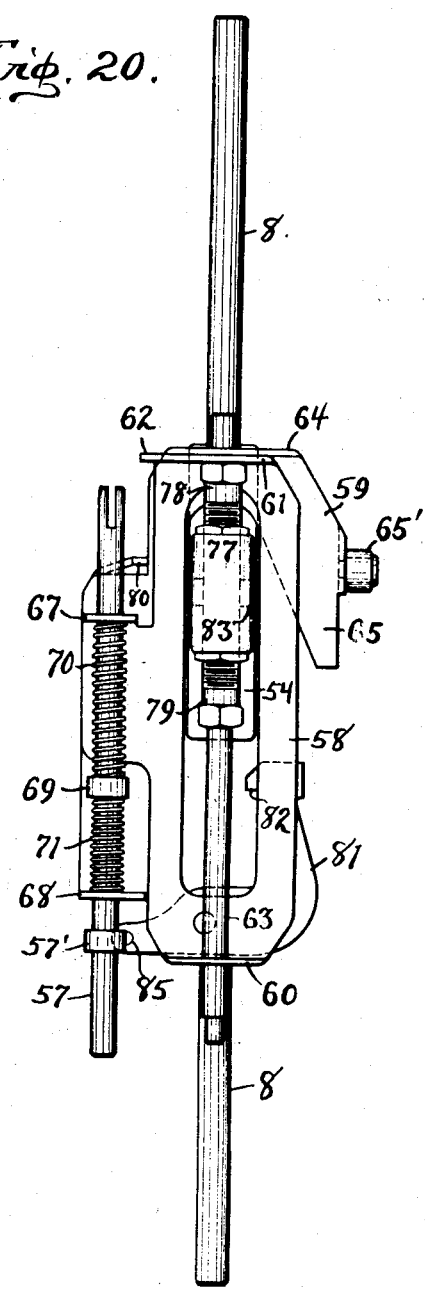
Byron J. Pepper INVENTOR
BY
A. G. Burns ATTORNEY Jan. 31, 1933.  B. J. PEPPER  1,896,056
FLUID DISPENSING APPARATUS
Filed Nov. 27, 1931  13 Sheets-Sheet 7

Byron J. Pepper
INVENTOR
BY
H. G. Burns ATTORNEY

Jan. 31, 1933.　　　　　B. J. PEPPER　　　　　1,896,056
FLUID DISPENSING APPARATUS
Filed Nov. 27, 1931　　　13 Sheets-Sheet 8
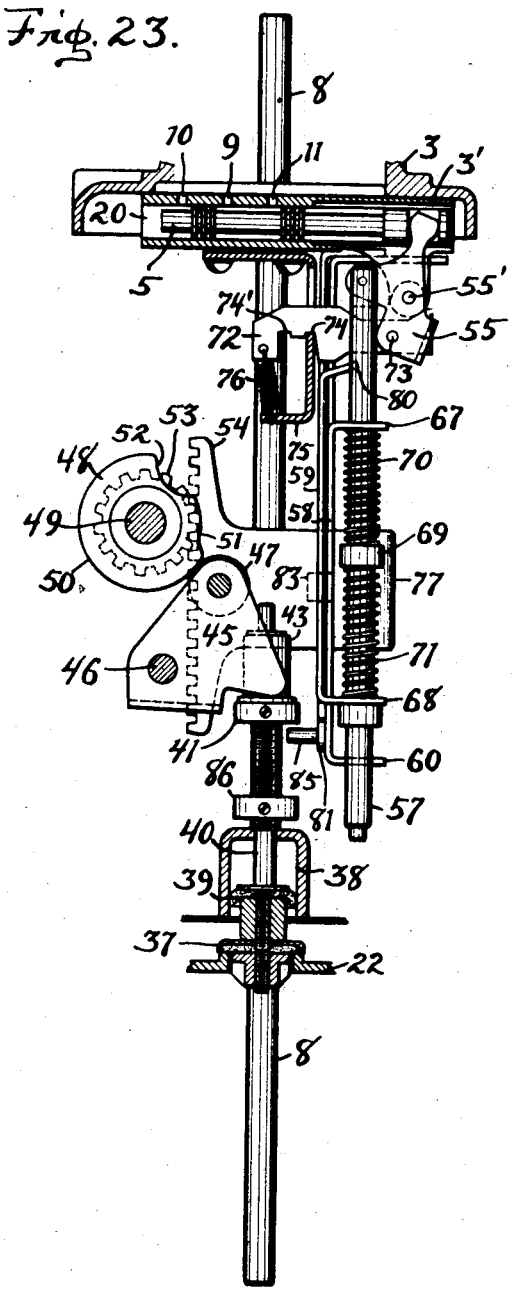
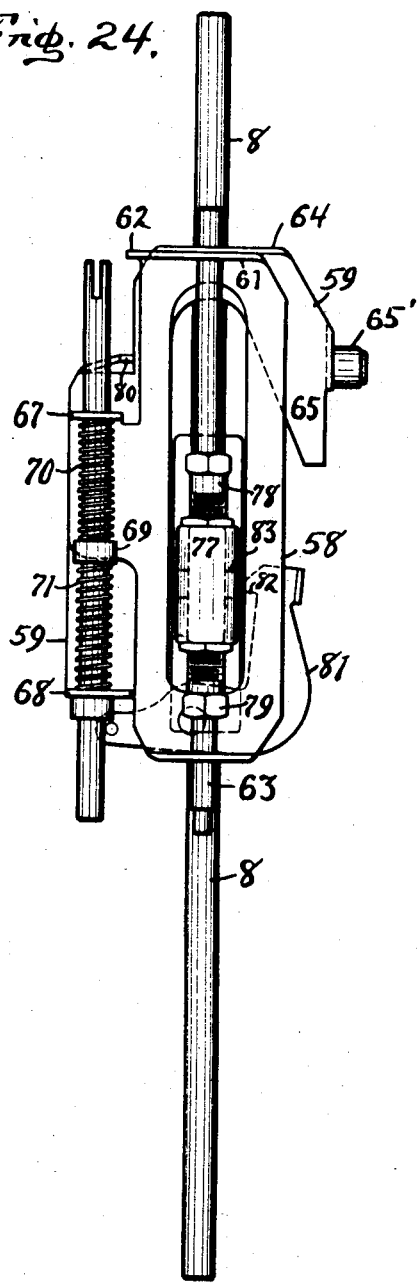
Byron J. Pepper
INVENTOR
BY
A. G. Burns ATTORNEY

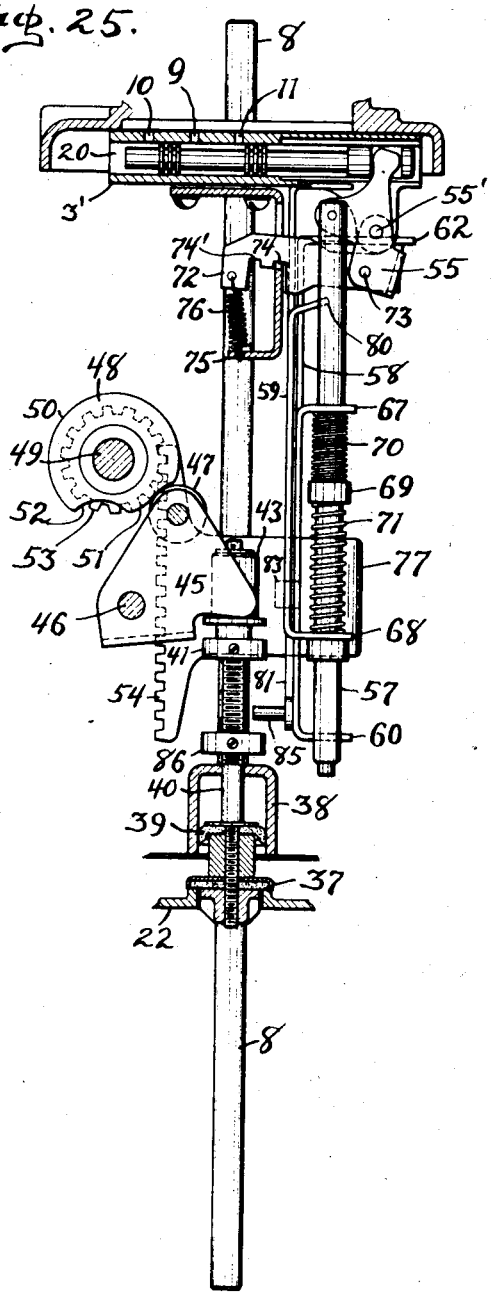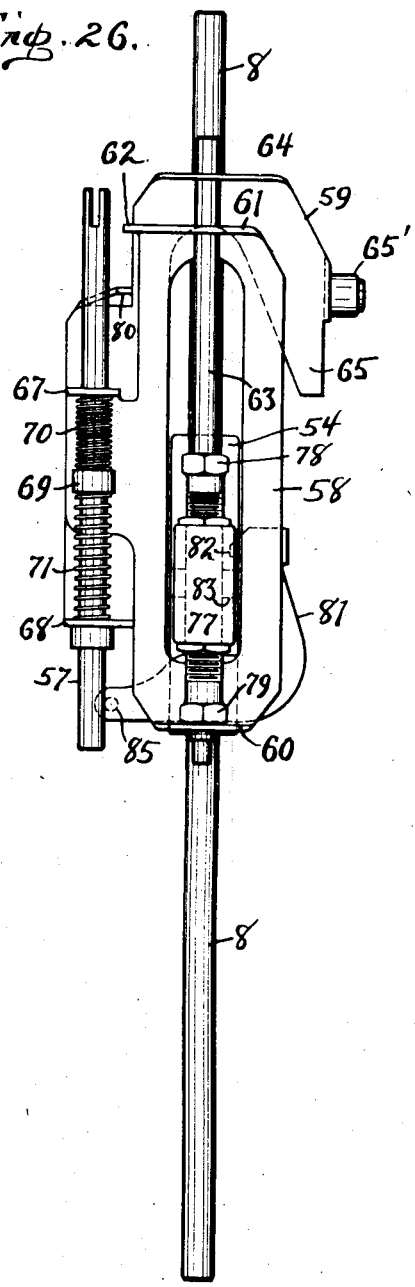

Jan. 31, 1933.  B. J. PEPPER  1,896,056
FLUID DISPENSING APPARATUS
Filed Nov. 27, 1931  13 Sheets-Sheet 10
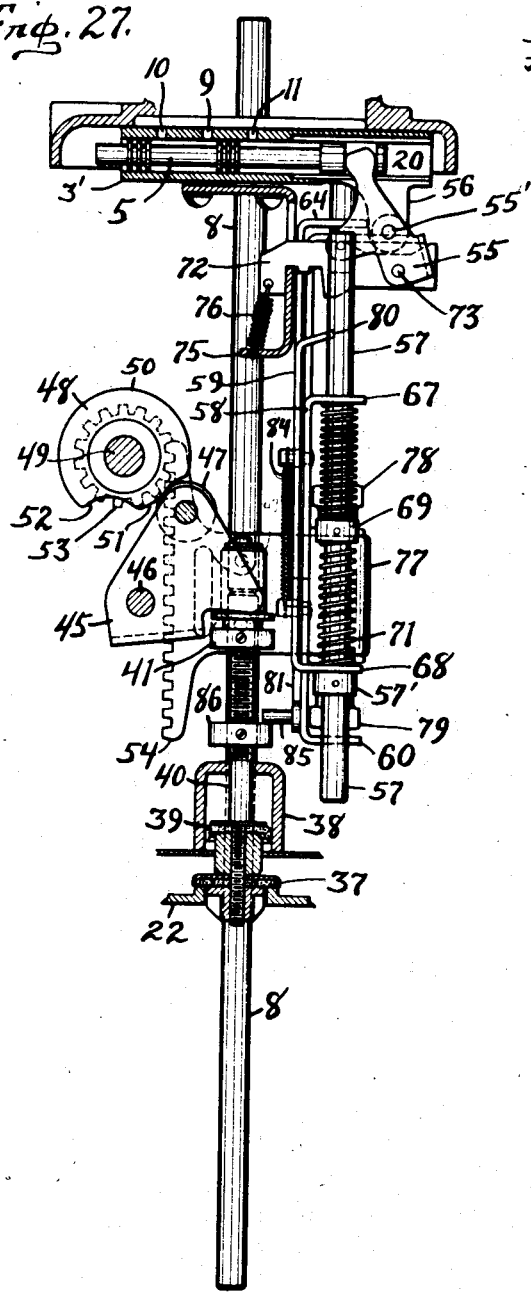
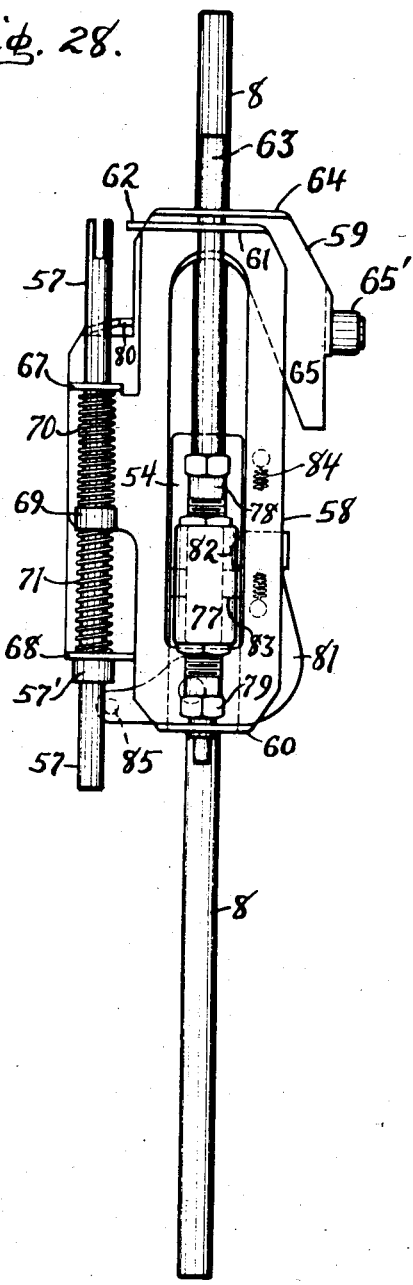
Byron J. Pepper
INVENTOR
BY
H. G. Burns  ATTORNEY

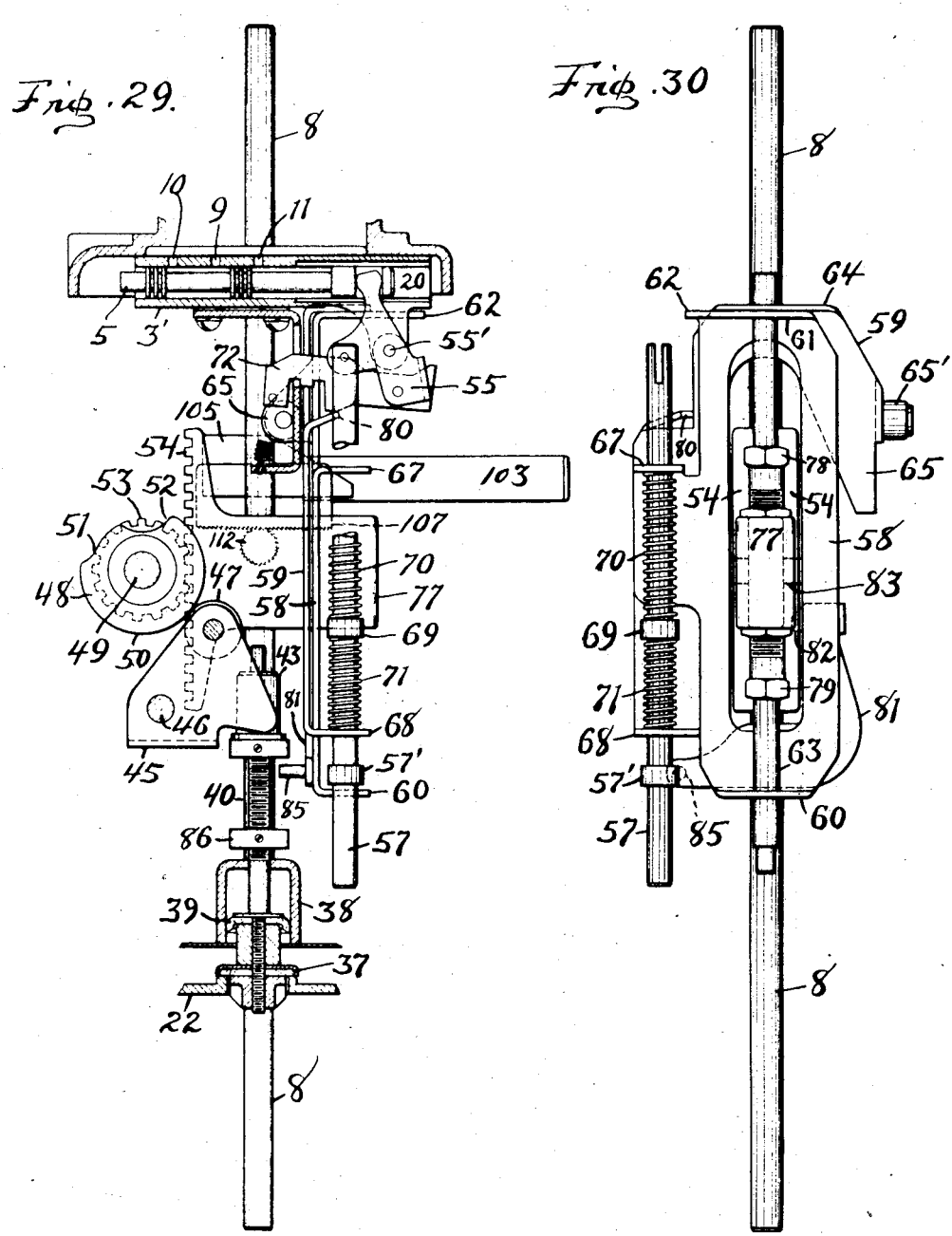

Jan. 31, 1933.    B. J. PEPPER    1,896,056
FLUID DISPENSING APPARATUS
Filed Nov. 27, 1931    13 Sheets-Sheet 12
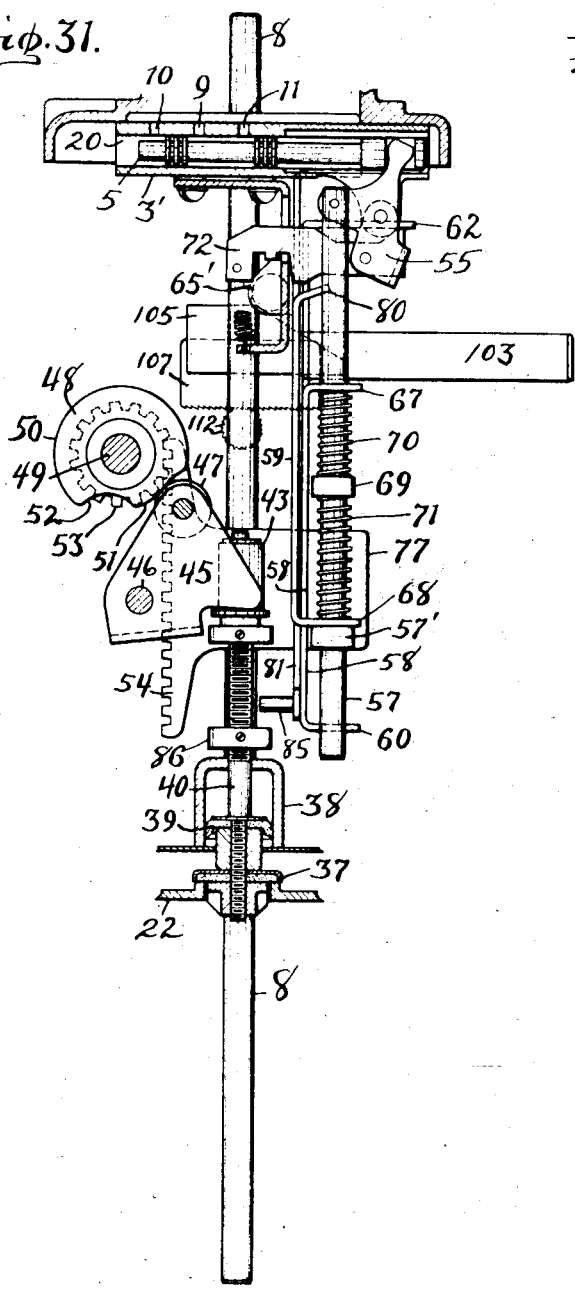
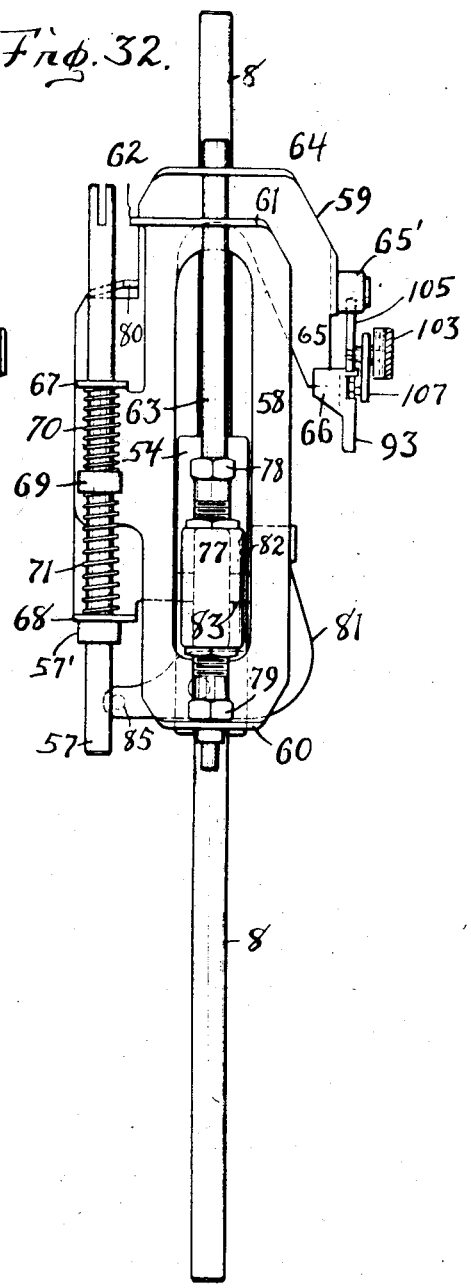
Byron J. Pepper
INVENTOR
BY
*W. G. Burns* ATTORNEY Jan. 31, 1933.    B. J. PEPPER    1,896,056
FLUID DISPENSING APPARATUS
Filed Nov. 27, 1931    13 Sheets-Sheet 13
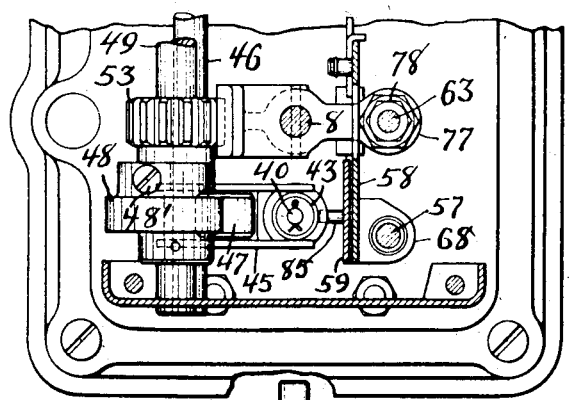
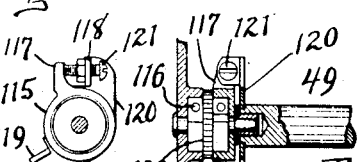
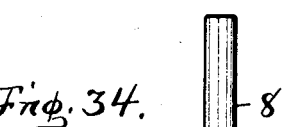
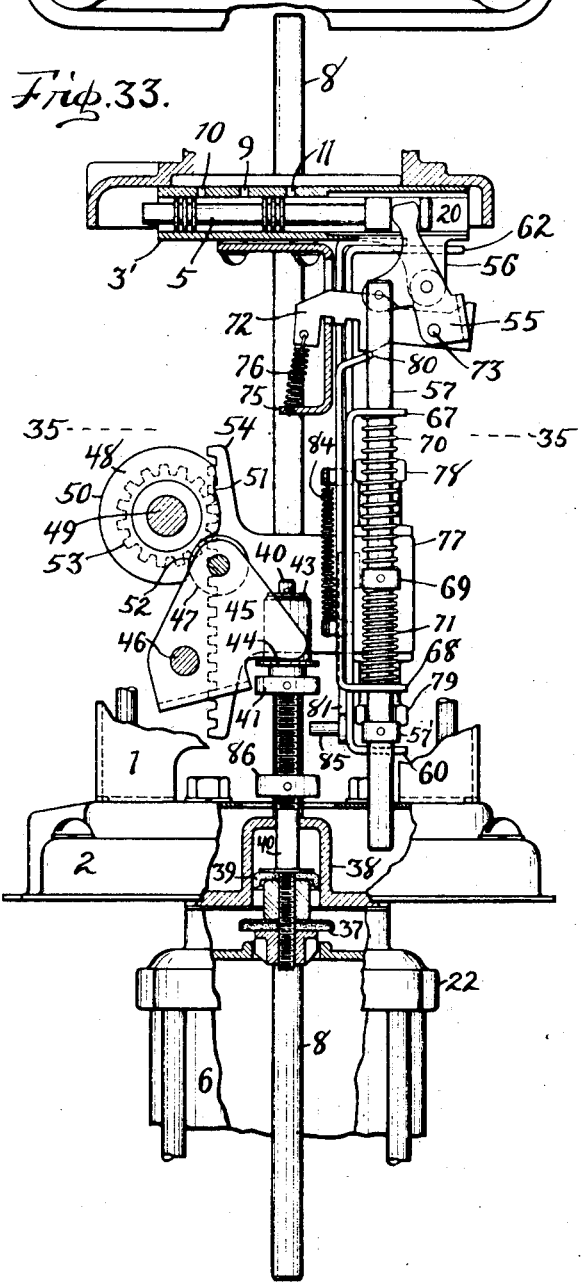
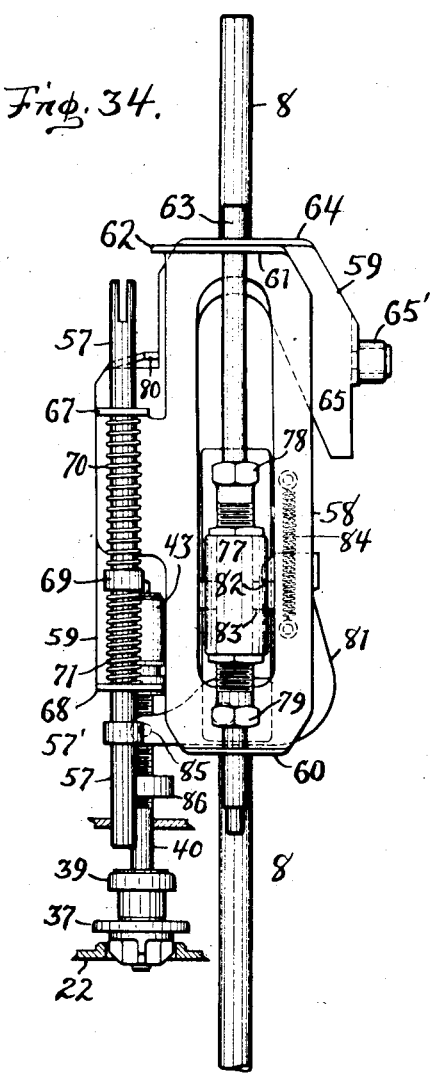
Byron J. Pepper
INVENTOR
BY
A. G. Burns  ATTORNEY Patented Jan. 31, 1933

1,896,056

UNITED STATES PATENT OFFICE

BYRON J. PEPPER, OF FORT WAYNE, INDIANA, ASSIGNOR TO TOKHEIM OIL TANK AND PUMP COMPANY, A CORPORATION OF INDIANA

FLUID DISPENSING APPARATUS

Application filed November 27, 1931. Serial No. 577,550.

This invention relates to improvements in fluid dispensing apparatus. One of the objects of the improvement is to provide means for dispensing fluid from a container to a point of delivery in precise predetermined quantities. And another object is to provide in conjunction with fluid dispensing apparatus means for accurately indicating the quantity of fluid dispensed thereby. And a further object is to provide a pumping means for fluid and an indicating means therefor so constructed that the indicating means is operated only and to such extent as delivery of fluid through the pumping means is effected.

Other objects and advantages of the invention will appear hereinafter.

A preferred illustrative embodiment of the invention is shown in the accompanying drawings, in which:—

Fig. 1 is a front elevation of an apparatus in which the invention is embodied, a portion thereof being broken away;

Fig. 2 is a fragmentary elevation of the appliance projected from Fig. 1, portions being shown in section;

Fig. 3 is a fragmentary top plan view of the pump cylinder and the plunger therein;

Fig. 4 is a vertical section of the lower portion of the pump including the plunger and inlet valve;

Fig. 5 is a rear elevation of the pump mechanism, a portion thereof being in section;

Fig. 6 is a projection of Fig. 5 at right angles thereto;

Fig. 7 is a detail view of a part of the valve operating mechanism for the pump;

Fig. 8 is a vertical section of the engine for actuating the pump;

Fig. 9 is an elevation projected from Fig. 8, parts being shown in section;

Fig. 10 is a detail view showing a transverse section of the valve actuating mechanism for the engine;

Fig. 11 is a detail view showing a vertical section through a part of the indicating mechanism;

Fig. 12 is a fragmentary plan view of the resetting mechanism, a portion thereof being in section;

Fig. 13 is an elevation projected from Fig. 12, a portion thereof being in section;

Fig. 14 is a front elevation of the indicating mechanism;

Fig. 15 is a vertical section projected from Fig. 14;

Fig. 16 is a rear elevation projected from Fig. 15;

Fig. 17 is an elevation of the valve operating mechanism for the machine, the parts being positioned as at the commencement of the cycle of operation thereof;

Fig. 18 is an elevation projected from Fig. 17 in a plan at right angles thereto;

Figure 21:
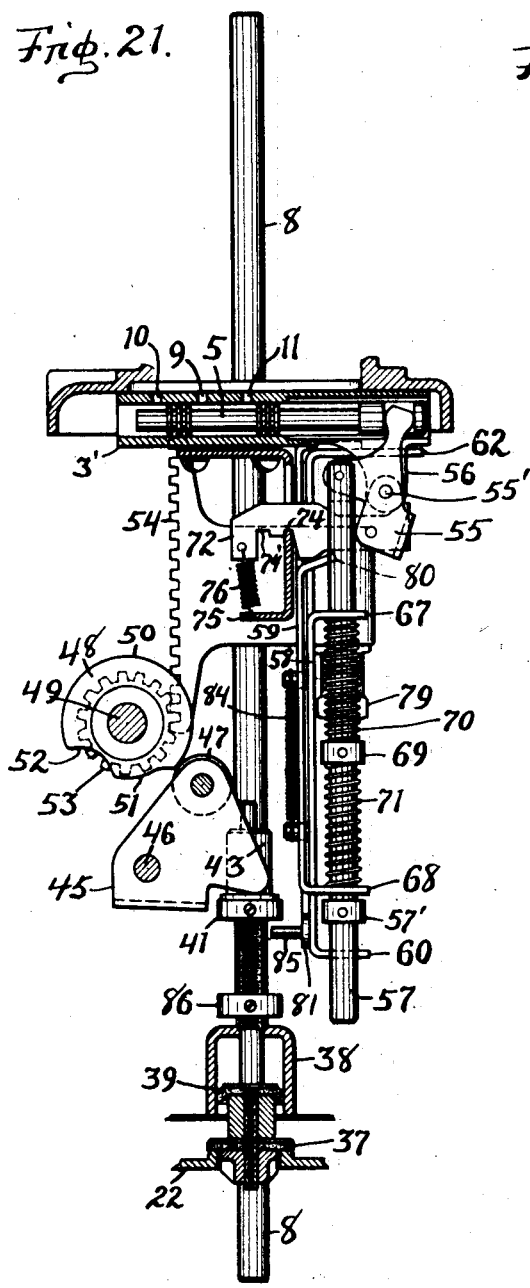

Figs. 19 and 20, 21 and 22, 23 and 24, 25 and 26, 27 and 28, 29 and 30, 31 and 32, and also 33 and 34 are views corresponding with Figs. 17 and 18 with the parts disposed in corresponding successive stages in the cycle of operation of the valve operating mechanism;

Fig. 35 is a fragmentary cross section of Fig. 33 on the line 35—35 thereof;

Fig. 36 is an end view of a driving clutch and its actuator for the indicator gearing; and Fig. 37 is a detail side view of the clutch and actuating mechanism for the indicator gearing, portions being in section.

Figs. 3 and 4, and 7 to 37 inclusive, are each drawn upon an enlarged scale.

The illustrative embodiment of the invention is in a form suited for dispensing lubricants such as grease, semi-liquid, oils, etc., and comprises a frame 1 having a base 2. Upon the top of the frame is supported an engine having a cylinder 3, piston head 4 and a valve 5, and in connection with the bottom of the frame is disposed a pump having a cylinder 6 and a piston 7. The engine cylinder 3 and the pump cylinder 6 are axially alined, and the piston-head 4 of the engine and the piston 7 of the pump are connected by a piston rod 8 and have simultaneous movement in their respective cylinders. (Fig. 2.)

The engine cylinder 3 has an intake port 9 and also communicating ports 10 and 11 for the lower and upper ends of the cylinder 3 respectively through which air under pressure is supplied to the cylinder in the opposite ends thereof alternately as the valve 5 is actuated. (Figs. 8 and 9.) The valve is so constructed as to establish communication between the intake port and one or the other of the communicating ports 10 and 11 accordingly as said valve is shifted from one of its positions to the other. The intake port 9 has communication with a valve-case 12 in which is located a spring-pressed check-valve 13 that controls the admission of compressed air to the intake port as it is supplied through a pipe 14 from any suitable source. Also, in said valve case is located a spring-pressed safety valve 15 that normally bears upon the check-valve 13 with sufficient force as to hold the check-valve open and thus permit air from the supply pipe 14 to enter the intake port 9. The spring 16 on the safety valve is compressed more or less accordingly as a threaded sleeve 17 through which the stem 18 of the safety valve extends is adjusted. In this manner the check-valve is held open with more or less force. In the event the pressure of air supplied through the pipe 14 becomes excessive the safety valve is raised in opposition to its spring 16 which permits the check-valve to close. Thus, the supply of air pressure to the engine cylinder is automatically regulated.

The valve case has therein a vent 19 whereby freedom of movement of the safety-valve is permitted. As air is admitted through the port 10 into the lower end of the cylinder the piston-head 4 therein is raised during which period air from the upper end of the cylinder is exhausted through the port 11 out through one end of the bore 20 for the valve 5. When the valve 5 is shifted so that air is admitted into the upper end of the cylinder through the port 11 the piston-head 4 is forced downwardly during such period the air in the lower end of the cylinder is exhausted through the port 10 out through the adjacent end of the bore for the valve 5.

The engine cylinder 3 has at its lower end a head 3' in which is located the bore 20 for the valve 5, and is provided with a stuffing box 21 for the piston rod 8.

The pump has upon the upper end of its cylinder 6 a head 22 (Fig. 2) provided with a surplus discharge port 23 and also a dispensing outlet port 24, and is provided at its lower end with a head 25 (Fig. 3) containing an inlet check-valve 26 and having connected with its lower end a suction pipe 27. The check-valve 26 has therein an opening 28 which permits passage therethrough of a sufficient amount of fluid from the lower end of the pump cylinder into the suction pipe as to relieve excessive pressure in the suction pipe or lower end of the cylinder upon operation of the plunger in either direction. Such relief has been found desirable especially when the transient material is in the form of a grease or heavy oil as it permits the check-valve to function smoothly, and furthermore admits of a compensating back-flow of liquid displaced in the upper end of the pump cylinder by the piston-rod 8.

The pump piston has a head 29 which is secured to the lower end of the piston-rod 8 and has therein an annular series of passageways 30 that are normally closed by a pliant valvular annulus 31 formed of suitable materials, such as leather, said annulus being secured upon the top of the head 29 by a circular spring-plate 32 and a shield ring 33 the inner margin of which is upturned to permit flexure of the annulus.

The piston thus formed admits, upon its downward stroke, the passage of fluid through the openings 30 past the annulus into the cylinder above the piston, and retractive movement of the fluid is prevented during the upward stroke of the piston through action of the annulus which closes said passageways.

In the head 22 is disposed a spring-pressed outlet check-valve 34 that controls passage of fluid from the upper end of the pump cylinder 6 out through the dispensing outlet port 24, there being provided a vented chamber 35 in said head in which operates a piston 36 on the stem of the check-valve 34 by which arrangement said check-valve is balanced with respect to pressure of the fluid in the outlet port 24. Also, in the head 22 is disposed a surplus outlet check-valve 37 that controls passage of fluid from the upper end of the pump cylinder 6 out through the surplus discharge port 23, there being provided a guideway 38 in said head in which operates a dash-head 39 on the stem of the check-valve 37 by which arrangement leakage of fluid through the head is prevented.

Upon the upper end of the stem 40 of the check-valve 37 (Fig. 7) are disposed a flanged collar 41 adjustably secured thereon, a compression spring 42 and a thimble 43 having limited axial movement upon the stem. The thimble has at its lower end an external flange 44 and is sustained in its uppermost position on the stem by said spring.

Within the frame 1 is pivotally mounted a rocker 45 upon a stationary shaft 46 which rocker engages the flange 44 of the thimble 43, and has a roller 47 which bears against the face of a cam 48 that is mounted upon a rotatable shaft 49 in the frame (Fig. 5). The outer periphery of the cam is so shaped as to have sequentially a concentric face 50, a minor depression 51 and a major depression 52, and the periphery of the cam bears against the roller 47 on the rocker which is actuated upon rotation of the cam. While the concentric face 50 of the cam has contact with the roller the thimble 43 is completely depressed so as to bear on the flange of the collar and thereby the check-valve 37 is held positively closed; while the roller 47 registers with the minor depression 51 the thimble 43 is pressed downwardly so as to partially compress the spring 42 and thus the check-valve 37 is yieldingly restrained from opening; and when the roller 47 registers with the major depression 52 the thimble is relieved entirely from pressure of the rocker and thus is permitted free opening of the check valve 37.

The cam shaft 49 has thereon a pinion 53 which meshes with a rack-member 54 that is secured on the piston-rod 8 whereby oscillating movement is imparted to the cam shaft as the piston rod reciprocates.

The valve 5 of the engine is reciprocated by a mechanism disposed in the frame which consists of a lever 5 pivotally mounted upon a bracket 56 that depends from the head 3' of the engine cylinder, and an actuating rod 57 therefor, the upper end of said rod being pivoted to the lever. The actuating rod 57 is loosely mounted in a pair of relatively movable slides 58 and 59 disposed in parallel planes closely adjacent each other. The slide 58 has at its bottom a forwardly extending ledge 60 and at its top a forwardly extending ledge 61 having a laterally projecting finger 62 hereinafter referred to, and a stationary post 63 in the frame extends loosely through said ledges and constitutes a guide for said slide. The slide 59 has at its upper end a forwardly extending ledge 64 through which said post extends and which overhangs the upper ledge 61 on the slide 58 whereby upward movement of the slide 58 is limited relative to the slide 59. Also, the slide 59 has a laterally extending portion 65 that bears against a guide 66 positioned in the frame whereby turning movement of the slide 59 upon the post 63 is prevented (Figs. 15 and 32). Turning movement of the slide 58 upon said post is prevented by the slide 59 which extends in a plane closely adjacent thereto. The slide 58 has a forwardly extending lug 67 and the slide 59 has a forwardly extending lug 68 through which the actuating rod 57 loosely extends, and on said rod at a point between said lugs is secured a collar 69. Between the lug 67 on the slide 58 and the collar 69 on the rod 57 is disposed a compression spring 70 and between said collar and the lug 68 on the slide 59 is disposed a compression spring 71. By means of said springs the slides are yieldingly sustained in their normal positions with respect to each other and also with respect to the actuating rod, there being a stop 57' secured on the rod 57 beneath the lug 68 to limit upward movement of the rod therethrough.

Figure 22:
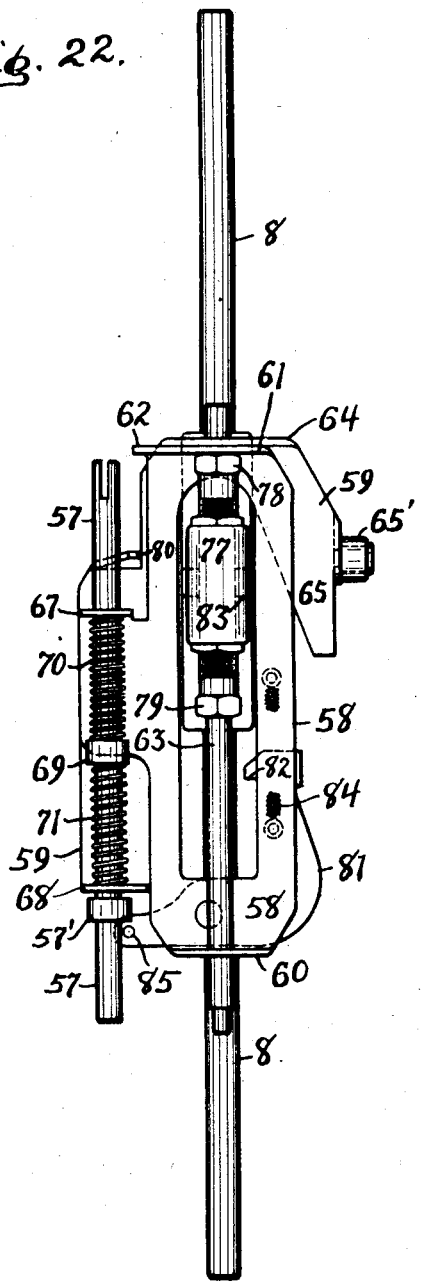

The lever 55 for actuating the engine valve 5 has connected with its lower end a lock-bar 72 by means of a pivot 73 (Fig. 9), said lock-bar having spaced notches 74 and 74' in which a stationary bracket 75 is adapted to have engagement selectively according to the position of said lock-bar and the lever 55 attached thereto, and thus, the engine valve 5 is detained at the corresponding end of its stroke. A tension spring 76 is connected with the lock-bar 72 and the bracket 75 which tends to hold the lock-bar in either of its engaging positions with said bracket. The rack-member 54 has a forwardly extending lug 77 provided with two adjustable sleeves 78 and 79 vertically disposed through which the post 63 loosely extends. The sleeve 78, as the upward stroke of the piston-rod 8 is being completed has engagement with the ledge 61 on the slide 58 (Figs. 19 and 20), whereupon the slides 58 and 59 are raised which causes compression of the spring 71, and also the inner end of the lock-bar is elevated through the medium of a finger 80 which projects from the slide 59 and has operative engagement with said bar. In this manner the lock-bar is released from the engagement of the stationary bracket 75 in its notch 74' which permits the valve lever 55 to turn upon its pivot 55' through action of the rod 57 by pressure of the spring 71, and thus the valve 5 is moved to its forward position and the bracket 75 becomes engaged in the notch 74 of the lock-bar 72 causing downward stroke of the piston rod (Figs. 21 and 22). The sleeve 79, as the downward stroke of the piston rod is being completed, has engagement with the ledge 60 on the plate 58 (Figs. 25 and 26) whereupon the slide 58 is moved downwardly causing compression of the spring 70, and also, the finger 62 on the ledge 61 of the plate 58 bears downwardly upon the outer end of the lock-bar 72 causing the inner end of the lock-bar to tilt upwardly, in which manner the lock-bar is released from the engagement of the stationary bracket 75 in its notch 74 which permits the valve lever 55 to turn upon its pivot 55' to its former position through action of the rod 57 by pressure of the spring 70, and thus the valve 5 is returned to its rear position and the bracket 75 becomes re-engaged in the notch 74' in the lock-bar 72 which actions are followed by the down-stroke of the engine piston and the pump. Also, as the actuating rod 57' is moved downwardly by expansion of the spring 70, the spring 71 becomes partially compressed against the lug 68 on the plate 59 causing said plate to move downwardly to its normal position. Movement of the valve 5 from one of its positions to the other causes reversal of the engine normally at the corresponding ends of its strokes, and the valve 5 is held in each instance stationary because of the engagement of the lock-bar 72 with the bracket 75.

The pump cylinder 6 is so proportioned and the full normal stroke of the plunger 7 is of such length that the fluid expelled from the pump cylinder upon the up-stroke of the piston exceeds a definite predetermined quantity thereof, the excess portion being expelled past the check-valve 37 out through the surplus outlet 23, after which is expelled past the check valve 34 through the dispensing outlet port 24 a definitely predetermined quantity of fluid, such discharge terminating upon completion of the up-stroke of the piston. Thus, the actual quantity of fluid expelled through the dispensing outlet 24 is measured accurately because of the preliminary expulsion through the surplus outlet of the excessive amount of fluid drawn into the pump cylinder by the action of the piston.

To insure that the fluid dispensed from the pump through the outlet port 24 is accurate in quantity, it is essential that accumulations of air that may be drawn into the pump be ejected along with the excess fluid through the surplus outlet 23 before commencement of delivery of the measured fluid through said outlet port 24. Provision is therefore made for such elimination of air from the upper end of the pump cylinder past the surplus check-valve 37, which provision also facilitates priming of the pump.

There is provided means for causing palpitation of the pump through action of the engine whereby fluid is drawn into the pump until its cylinder is completely filled with said substance before expulsion thereof takes place through the outlet port 24. Such means comprises a priming latch 81 that is pivotally mounted upon the lower end of the slide 58 and which has a hook 82 adapted, at the end of the down-stroke of the pump, to have engagement with a lug 83 that projects from the side of the lug 77 on the rack-member, so that when said latch has such engagement and the rack-member is raised, upward movement is correspondingly imparted to the slide 58 causing premature reversal of the pump mechanism.

The priming latch 81 is yieldingly sustained in locking position by means of a tension spring 84, the opposite ends of which are respectively attached to said latch and slide 58, and the latch has a stud 85 that projects into the path of a collar 86 adjustably positioned on the stem 40 of the check-valve 37 for the surplus outlet (Figs. 21, 27 and 33) whereby when said check-valve is raised to open position while the slide 58 is at the end of its down-stroke the latch is thrown out of locking engagement with the lug 83, thus permitting full upward stroke of the pump. When the pump is at the end of its downstroke the roller 47 on the rocker 45 registers in the minor depression 51 of the cam 48 (Figs. 25, 27 and 31), whereupon the check-valve 37 is yieldingly restrained from opening because of the pressure of the spring 42 in the thimble 43 which is partially depressed by the rocker 45. In this manner at the commencement of the up-stroke of the pump, if the upper end of the pump cylinder contains air, the air becomes compressed therein without consequent raising of the check-valve, thus permitting the latch to remain engaged with the lug on the rack-member.

As the up-stroke of the pump continues (Figs. 33 and 34), the slides 58 and 59 are correspondingly raised because of engagement of the latch 81 with the rack-member; the spring 71 is compressed; the cam 48 is turned so that the roller 47 enters the major depression 52 in the cam, whereupon pressure of the rocker 45 on the thimble 43 is entirely relieved; and the surplus valve 37 opens which permits escapement of the entrapped air from the pump cylinder. Also, the lock-bar 72 is raised by engagement therewith of the finger 80 on the slide 59 whereupon the engine valve 5 becomes shifted to its opposite position by the expanding action of the spring 71 causing reversal in the stroke of the pump and the return of its piston to the end of its downstroke. This palpitating operation is repeated until a sufficient quantity of liquid is drawn into the pump cylinder through the piston as to cause complete displacement of air entrapped therein and overflow of the air and liquid through the surplus discharge port 23. In this manner the pump is normally maintained completely full of liquid.

After the pump has been completely primed, the up-stroke of the plunger immediately at the commencement thereof (Figs. 2, 5 and 27) the consequent pressure of liquid in the upper end of the cylinder forces the check-valve 37 upwardly in opposition to the spring 42 in the thimble 43 causing discharge of liquid to take place through the surplus outlet port 23, the spring 34' for the check-valve 34 being of greater strength than the spring 42 prevents the check-valve 34 from opening during escape of liquid through the surplus discharge port. When the check-valve 37 is thus raised the collar 86 on its stem 40 by engagement with the stud 85 throws the priming latch 81 out of engagement with the rack-member as the upward stroke of the pump continues, and also the cam 48 is progressed until the roller 47 on the rocker 45 bears upon its concentric face 50 which causes the rocker to completely compress the thimble 43 against the collar 41 and thus holding the check-valve 37 firmly seated in closed position, after which, upon further upward stroke of the piston, the pressure of liquid in the cylinder above the piston causes the check-valve 34 to rise in opposition to its spring 34' so that the discharge of liquid takes place through the dispensing port 24 continuously until the up-stroke of the piston is fully completed. By adjustment of the sleeve 78 on the lug 77 of the rack-member the length of the upward stroke of the pump may be assured.

The cam 48 and the priming latch 81 are operatively related with the surplus valve 37, and the cam is also operatively related with the pump piston, the arrangement being such that at the commencement of the upstroke of the pump the priming latch has engagement with the actuating mechanism of the pump or is moved out of engaging position therewith dependent upon the surplus valve being closed or opened. When the pump cylinder is completely filled with liquid the surplus valve is opened against resistance of its spring 42 at the commencement of the up-stroke of the pump causing the priming latch to be moved out of engaging position whereupon full stroke of the pump takes place. However, when the pump cylinder contains air, the air becomes compressed therein as the pump piston moves upwardly, the surplus valve being held in closed position by its spring 42, and thus the priming latch remains engaged with the actuating mechanism causing reversal in the stroke of the pump which takes place after opening of the surplus valve which occurs when pressure of its spring 42 is relieved through action of the cam 48 and rocker 45 to permit the entrapped air in the pump cylinder to escape through the surplus valve. By this provision full stroke of the pump and consequent discharge of liquid from the pump through the dispensing port is dependent upon any content of air in the pump cylinder being first excluded therefrom through the surplus valve, whereby is insured dispensation of only liquid from the pump.

The cam 48 is provided with a set-screw 48' in its hub and is rotatively adjustable on the shaft relative to the rack gear 53, so that by adjustment of the cam positive closing of the surplus valve may be made to occur at an earlier or later period in the up-stroke of the pump accordingly, and thus, the quantity of liquid discharged through the dispensing port is varied.

During the downward stroke of the pump piston a sufficient amount of liquid in the lower end of the cylinder escapes back through the opening 28 in the check-valve 26 (Fig. 4), the opening being so proportioned as to limit the escaping liquid to only a sufficient amount as to compensate for the displacement of liquid in the pump cylinder above the plunger which is occasioned by the piston-rod therein. In this manner excessive discharge through the dispensing port or excessive pressure in the cylinder is prevented.

In connection with the hereinbefore described pumping mechanism is provided a register constituted of an indicator for the successive units of measured liquid as they are discharged through the dispensing port, and a counter of usual construction by which the dispensed units are summarized (Figs. 14, 15 and 16).

The counter consists of a circular case 87 having therein a partition 88 upon the front of which is secured a dial 89 displaying an annular scale 90. A gear 91 (Fig. 11) having a hollow hub 92 is rotatably mounted back of the partition 88, the ends of said hub having bearings respectively in said partition and a stationary bracket 93. Forwardly in the bore of said hub is loosely disposed a collar 94, and a shaft 95 extends loosely through the rear end of said hub 92, its forward end extending through said collar and having mounted thereon an index 96 disposed so as to be circulated in a plane in front of the dial upon rotation of the shaft. Upon the shaft 95 is disposed a compression spring 97 that presses oppositely against said collar and the inner end of the hub whereby relative turning movement of the shaft and the gear is frictionally resisted so that upon rotary movement of the gear 91 the index 96 is progressed accordingly over the scale.

The counter 97 (Fig. 16) is positioned back of the partition 88 and is exposed through a sight opening 98 in the dial (Fig. 14) for convenient reading thereof, and has actuated relation with the gear 91 by means of suitable gear mechanism 99.

The cam shaft 49 is operatively related with the gear 91 by any suitable mechanism which may include a gear 100 whereby movement is imparted to the gear 91 during that portion of the upstroke of the pump while liquid from the pump cylinder is being expelled through the dispensing port 24 so that the index 96 progresses clockwise to a proportionate extent. Such mechanism (Figs. 2, 36 and 37) preferably consists of a driving clutch member 115 operatively related with the gear 100 so as to impart rotary movement to said gear in one direction only when oscillated, and another clutch member 116 arranged in operative relation with said gear so as to prevent retraction of said gear in the opposite direction. The driving clutch member 115 has a radially extending lug 117 disposed between spaced jaws 118 and 119 on a lever 120 that is secured on the cam-shaft 49, there being an adjusting screw 121 in the jaw 118 that has contact with the lug 117 during movement of the cam-shaft in one direction. The jaw 119 has contact with the lug 117 during movement of the cam-shaft in the opposite direction. The jaws on the lever 120 are so spaced as to permit of more or less play of the lug on the driving clutch member between the jaw 119 and the screw 121. By this means, when the screw 120 is properly adjusted movement is imparted from the cam-shaft to the indicator gearing only during that portion of the stroke of the pump when the surplus valve is held positively closed and the discharge from the pump takes place only through the dispensing port.

A latch-spring 101 secured in the case, one end of which projects loosely through the partition 88 and the dial 89 into the path of the index 96 constitutes a back-stop 102 so that said index upon backward movement thereof is arrested upon reaching its zenith, or the zero point on the scale.

It is desirable that upon commencement of the dispensing operation that the index be reset to said zero point, and that the pump mechanism be reset to the point of commencement of its upstroke in order that the amount of liquid dispensed upon each operation be accurately indicated. For this purpose resetting mechanism is provided consisting of a longitudinally movable manually operated bar 103 (Figs. 12, 13, 15, 16, 29 and 31) having a tension spring 104 for holding it in its innermost position.

Secured to the inner portion of said bar in a plane parallel therewith and spaced apart therefrom is a wedge-shaped cam 105, there being studs 106 securing the same together, and upon said studs between the bar and cam is disposed a rack-plate 107, the lower edge thereof being notched. Said rack-plate has therein parallel slots 108 diagonally disposed through which the studs 106 loosely extend, and said rack-plate has a stud 109 having mounted thereon a detent spring 110 that has sliding movement in a horizontal slot 111 in the bracket 93, said slot being so proportioned as to admit also limited vertical movement therein of the stud 109. Thus, when the operating bar 103 is moved backwardly through action of its spring 104 said plate is first raised and then moved backwardly, and when said operating bar is pulled forwardly said rack-plate is first moved downwardly and then forwardly during which latter operation the toothed lower edge of the rack-plate is moved into engagement with a notched wheel 112 secured on the inner end of the shaft 95 for the index, causing backward rotary movement thereof, whereby said index is reset against the backstop 102. The wedge-cam 105 has longitudinal sliding movement on the bracket 93 as the bar 103 is actuated, and a roller 65' on said slide 59 rests upon the slanting face of the cam so that as the operating bar 103 is drawn outwardly said slide is moved upwardly (Fig. 31) thereby causing the engine-valve 5 to become shifted to position for the down-stroke of the engine, whereupon the pump piston is returned to its lowermost position.

In using the invention the pipe 14 is connected with any suitable source of compressed air, and the outlet port has connected therewith any convenient means through which the liquid is dispensed, such as a pipe 24' or hose, preferably having a manually operated discharge nozzle (not shown) ordinarily used in connection with liquid dispensing apparatus. The apparatus thus connected is positioned upon a container 113 with its base 2 resting upon the top thereof so as to cover the opening 114 therein and with its suction pipe 27 projected downwardly into the container. Also, the base 2 is positioned over the opening 114 so that the surplus discharge port 23 has free communication through said opening with the container.

When air pressure is applied through the pipe 14, the engine is activated causing reciprocation of the pump piston, whereupon liquid is drawn from the container through the suction pipe into the pump cylinder. Any content of air within the cylinder becomes expelled past the surplus outlet check-valve 37, until the pump cylinder becomes completely filled with liquid. After the initial priming of the apparatus the quantity of liquid drawn into the pump upon each upward stroke of its piston is in excess of the predetermined quantity to be dispensed through the dispensing port, the excess amount being first expelled through the surplus discharge port 23 back into the container, the residue being expelled through the dispensing port 24 during completion of the up-stroke of the piston. Thus, the actual delivery of liquid through the dispensing outlet upon each complete operation of the pump is of the accurate quantity as predetermined.

I claim:

1. In dispensing apparatus, a pump having an inlet, a surplus outlet and a dispensing outlet port, valves for said inlet, outlet and port respectively, actuating mechanism for the pump having reversing means therefor operable normally at the end of each stroke of the pump, a lock normally preventing reversal of said mechanism between the ends of the pump strokes, a surplus latch on said reversing means operatively related with the surplus outlet valve and disposed when the pump is at the commencement of its discharge stroke to engage said actuating mechanism or to be moved out of engaging position dependent upon closed or open position of the surplus outlet valve, a cam operated means driven by said actuating mechanism whereby the valve for said surplus outlet during the discharge stroke is successively restrained yieldingly from opening, released and then held positively closed, and a spring on the valve for the dispensing port adapted to resist opening thereof with greater restraint than the yielding restraint applied to said surplus valve.

2. In dispensing apparatus, a pump having an inlet, a surplus outlet and a dispensing outlet port, valves for said inlet, outlet and port respectively, actuating mechanism for the pump having reversing means therefor operable normally at the end of each stroke of the pump, a priming latch on said reversing means operatively related with the surplus outlet valve and disposed when the pump is at the commencement of its discharge stroke to engage said actuating mechanism or to be moved out of engaging position dependent upon closed or open position of the surplus outlet valve, a cam operated means driven by said actuating mechanism whereby the valve for said surplus outlet during the discharge stroke is successively restrained yieldingly from opening, released and then held positively closed, and a spring on the valve for the dispensing port adapted to resist opening thereof with greater restraint than the yielding restraint applied to said surplus valve.

3. In dispensing apparatus, a pump having an inlet, a surplus outlet and a dispensing outlet, a spring-restrained check-valve controlling the dispensing outlet, another check-valve controlling said surplus outlet, actuating mechanism for said pump, and means driven by said actuating mechanism and operatively related with the surplus valve, so disposed that during the first portion of the discharge stroke of the pump said surplus valve is yieldingly restrained from opening, during the next succeeding portion of said stroke is free to open, and during the remaining portion is held positively closed, whereby discharge from the pump during said first and next succeeding portions of said stroke takes place only through said surplus outlet and during the remaining portion only through said dispensing outlet.

4. In dispensing apparatus, a pump having a check-valve controlled inlet, a surplus outlet and a dispensing outlet, actuating mechanism for said pump, an individual check-valve for each of said outlets, and means for controlling each outlet valve so disposed that during the first portion of the discharge stroke of the pump discharge therefrom takes place only through the surplus outlet and during the remaining portion only through the dispensing outlet.

5. A measuring pump having a cylinder provided with an inlet, a surplus outlet and a dispensing outlet, and a valvular piston provided with a piston rod therefor reciprocable in said cylinder between said inlet and said outlets, a check-valve controlling said inlet having a relief opening therein to permit back-flow therethrough sufficiently to compensate for the displacement by the piston rod of liquid in the cylinder, a yieldingly restrained check-valve for said dispensing outlet, another check-valve for said surplus outlet, and means operatively related with said surplus check-valve disposed to permit opening thereof and discharge from the pump cylinder through the surplus outlet during a certain first portion of the discharge stroke of said piston and to positively close said surplus check-valve during the other portion of said discharge stroke whereby a definite quantity of liquid is discharged from the pump through its dispensing outlet upon each complete operation of said pump.

6. A measuring pump having a cylinder provided with an inlet and an outlet port, and a reciprocating piston in said cylinder, a spring-pressed check-valve controlling the discharge from said cylinder through the outlet port, and a vented chamber having therein a piston secured to the stem of said valve so arranged that said valve is balanced with respect to fluid pressure in the outlet port.

7. A fluid measuring apparatus comprising a container for liquid a pump provided with a suction inlet connected with said container, a valve-controlled surplus outlet communicating with said container and a yieldingly restrained valve controlled dispensing port, actuating means for the pump, and a mechanism operatively related with said means and the valve for the surplus outlet means so constructed that said surplus outlet valve is yieldingly restrained during the first portion of the upstroke of the pump, then relieved of yielding restraint during a succeeding portion of said upstroke and is positively closed during the remaining portion of said upstroke, the valve for said dispensing port being adapted to permit discharge from the pump through the dispensing port only when the valve for the surplus outlet is positively closed.

8. A fluid measuring apparatus comprising a container for liquid, a pump provided with a suction inlet connected with said container, a valve controlled surplus outlet communicating with said container and a yieldingly restrained valve controlled dispensing port, actuating means for the pump, a mechanism operatively related with said means and the valve for the surplus outlet so constructed that said surplus outlet valve is yieldingly restrained during the first portion of the upstroke of the pump, then relieved of yielding restraint during a succeeding portion of said upstroke and is positively closed during the remaining portion of said upstroke, the valve for said dispensing port being adapted to permit discharge from the pump through the dispensing port only when the valve for the surplus outlet is positively closed, and an indicator having operative connection with said mechanism so constituted that said indicator is actuated upon operation of the pump only during the discharge of liquid through the dispensing outlet.

9. A fluid measuring apparatus comprising a container, a measuring pump receiving fluid from said container and having a dispensing port and provided with a surplus outlet through which fluid is returned to said container, actuating means for said pump, and means controlling the discharge from the pump through said dispensing port and surplus outlet so constituted as to prevent discharge through the dispensing port and surplus outlet at the same time.

10. In liquid dispensing apparatus, a measuring pump having an inlet and a dispensing port and provided with a surplus outlet, actuating means for said pump, mechanism operatively related with said actuating means for controlling the discharge from the pump through said outlet, and controlling means for said port, said mechanism and said controlling means being so constituted that the discharges from the pump through said port and outlet take place respectively during different portions of the stroke of said pump.

11. In liquid dispensing apparatus, a measuring pump having an inlet and a dispensing port and provided with a surplus outlet, actuating means for said pump, mechanism operatively related with said actuating means for controlling the discharge from the pump through said outlet, controlling means for said port, said mechanism and controlling means being so constituted that the discharges from the pump through said port and outlet take place respectively during different portions of the stroke of said pump, and an indicator having a connection with said actuating means so constituted as to be inoperative during discharge from the pump through said outlet and operative only during discharge through said port.

12. In liquid dispensing apparatus, a pump having actuating mechanism therefor provided with an intake, a dispensing port and a surplus outlet, and means controlling said port and outlet, the controlling means for said outlet being operatively related with said actuating mechanism, said controlling means for said port and outlet being arranged so that the discharges from the pump through said port and outlet take place at different periods in the stroke of the pump.

13. In liquid dispensing apparatus, a pump having actuating mechanism therefor provided with an inlet and two outlets, and means controlling said outlets so constituted that the discharge from the pump through one of said outlets takes place only during a predetermined portion of the stroke of the pump while discharge through the other outlet is prevented.

14. In liquid dispensing apparatus, a pump having a suction inlet, a dispensing port and a surplus outlet, actuating means for the pump, valve mechanisms for said port and outlet so constituted that discharge of fluid from the pump through said port is dependent upon the pump cylinder being substantially filled with liquid.

15. In liquid dispensing apparatus, a reciprocating pump having actuating means therefor, and provided with a suction inlet, dispensing port and surplus outlet, an indicator in connection with said actuating means operable only during discharge from the pump through the dispensing port, controlling means for said port and outlet so constituted as to prevent simultaneous discharge therethrough, and manually operated mechanism having operable relation with said indicator and actuating means adapted to reset said indicator and pump respectively to their starting points.

16. In liquid dispensing apparatus, a plunger pump having actuating means therefor and provided with an inlet and two valve-controlled outlets, and a mechanism actuated by said means controlling the valve for one of said outlets, and a restraining means for the valve of the second outlet, said mechanism and restraining means being so constituted that discharge from the pump through the second outlet is dependent upon expulsion of surplus fluid from the pump cylinder through the other outlet previously thereto so that the quantity of liquid discharged through the second outlet is of a predetermined quantity.

In testimony whereof I affix my signature.

BYRON J. PEPPER.